UNITED STATES PATENT OFFICE.

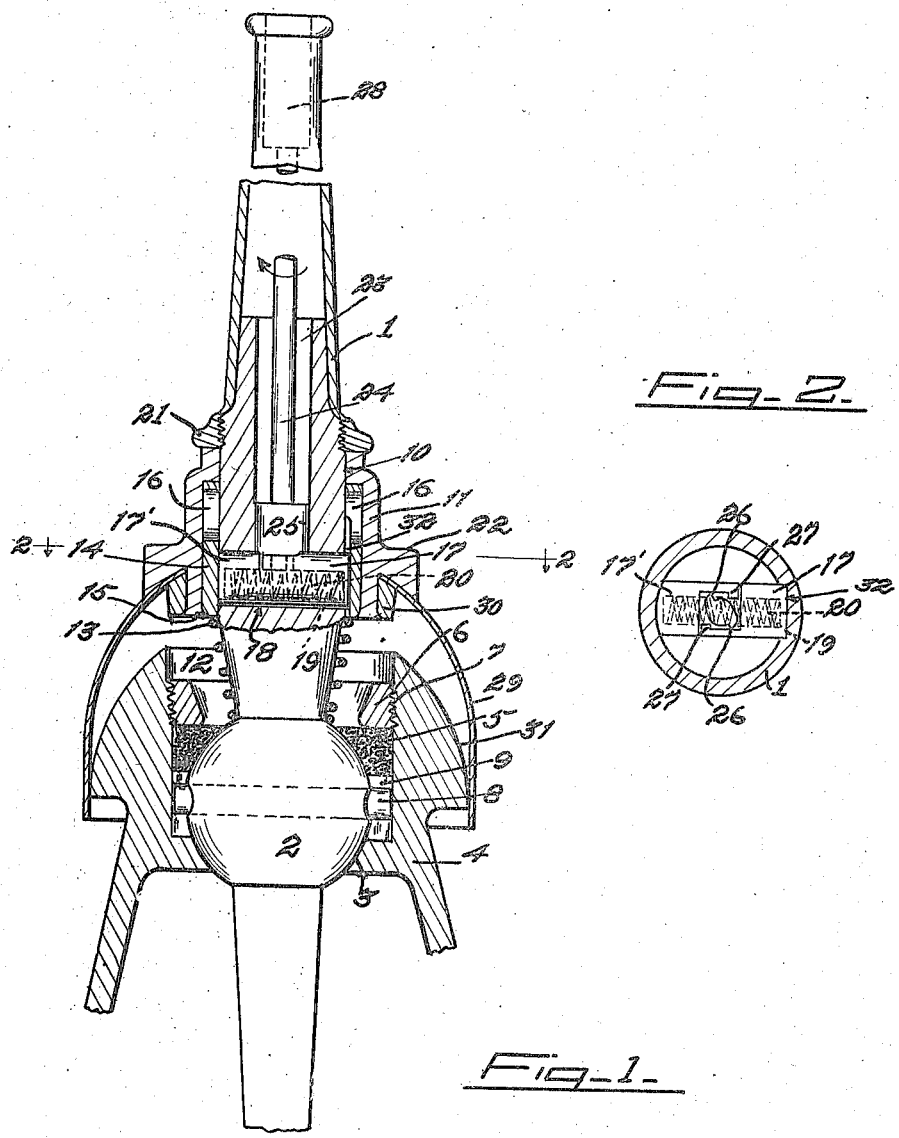

GEORGE C. JENSEN, OF OAKLAND, CALIFORNIA.

DEVICE FOR LOCKING MOVABLE LEVERS.

1,233,786.     Specification of Letters Patent.     Patented July 17, 1917.

Application filed December 18, 1916. Serial No. 137,516.

*To all whom it may concern:*

Be it known that I, GEORGE C. JENSEN, a citizen of the United States, residing at Oakland, in the county of Alameda and State of California, have invented certain new and useful Improvements in Devices for Locking Movable Levers, of which the following is a specification.

The present invention relates to locking devices for vehicles and is more particularly adapted for use in connection with the gear shifting levers of motor vehicles to enable the lever to be locked in neutral position, thereby preventing the movement of the vehicle under its own power, and at the same time enabling the vehicle to be moved by power applied from without, as, for example, when it is desired to move the vehicle from place to place in a garage or other storage building.

The invention consists in providing a lock member having a sliding movement relative to the lever and adapted when in one position to engage a stationary means surrounding the lever to lock the lever from movement relative to its support and having a locking means carried by the lever for engaging the lock member to retain the same in locked position after being manually moved thereto, and which is capable of releasing by the operation of mechanism preferably in the upper end of the lever within easy reach of the vehicle operator.

With the above mentioned and other objects in view the invention consists in the novel construction and combination of parts hereinafter described, illustrated in the accompanying drawings, and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference is directed to the accompanying drawings, wherein—

Figure 1 is a vertical sectional view of a gear shifting lever with the preferred embodiment of my locking mechanism applied thereto, and with the locking member in raised or inoperative position.

Fig. 2 is a sectional view taken on line 2—2 of Fig. 1.

In the drawings, 1 indicates a lever illustrated as a shifting lever employed in connection with motor vehicles having a variable speed power transmitting mechanism. The lever is provided at its fulcrum point within its length with a spherical portion 2, for reception within a socket 3 carried by a tubular member 4 through which the lower end of the member extends, and said tubular member is preferably supported by the upper portion of a gear case, not shown. The upper end of the said tubular member is adapted for receiving a suitable packing 5, for contacting with the upper surface of the spherical portion 2 and is forced into contact therewith to maintain the portion 2 of the lever in its socket 3 by an adjusting nut 6, which has threaded engagement at 7, with the upper portion of the interior surface of the tubular member 4.

Suitable guiding lugs 8 project beyond the peripheral surface of the spherical portion 2, and are received at all times within the vertically disposed grooves 9 formed within the interior of the tubular member 4 above the socket 3, said lugs preventing the rotation of the lever on a vertical axis within its socket. The lever 1, is provided above the spherical portion 2 with a bearing portion 10, and lineally slidable on said bearing portion 10 is a locking member 11, tubular in form, and adapted when in its operative or locked position to be received at its lower end in an annular seat or recess 12 in the upper portion of the tubular member 4 above the nut 6.

A coiled spring 13, surrounding the lever 1, above the spherical portion thereof contacts with the lower edge of the locking member 11 and normally retains the same in its inoperative or unlocked position. The inner lower surface of the locking member 11 is broached to receive a suitable sleeve 14 surrounding the guide portion 10, and secured to slide with the locking member in any suitable manner, as by bending or forcing the lower edge of the locking member thereover, as at 15. The sleeve is provided adjacent its upper edge with the latch receiving openings 16 in which are adapted to be received the horizontal reciprocating latches 17 and 17' carried in a transverse bore 18 in the lever 1, when the locking member is in its operative or locking position. The latches are each provided in their inner coöperative ends with a channel 19 for receiving a coiled spring 20, the action of which is to simultaneously force said latches outwardly. A suitable collar or flange 21, threaded or otherwise secured to the upper end of the guide portion 10 of the lever limits the upward movement of the locking member 11 on the lever and to enable the locking member to be depressed against the action of the spring 13 and forced into operative or locked position, the same is provided with a circumferential flange 22 for receiving a downward pressure exerted by the operator. The lever is provided with the longitudinal bore 23 extending upwardly therein above the horizontal latch receiving bore and in the same is rotatably mounted a controlling rod or member 24 carrying on its lower end an enlarged member 25 provided at diametrically opposite points with the fingers 26 which are adapted when the rod is rotated in a clockwise direction to engage the inwardly projecting lugs 27 on the overlapping extensions on the latch members 17 and 17'.

The upper end of the rod or member 24, carries a lock barrel 28, adapted to be controlled for rotation by a controlling key, not shown, and a rotative movement of the barrel in the direction of the arrow rotates the head 25, causing the fingers 26 thereon to draw the latch members 17 and 17' inwardly and release the upper ends thereof from the latch receiving openings 16 when the lock member 11 is in its depressed or operative position, permitting the spring 13 to force the same upwardly into its inoperative position.

When the locking member 11 is depressed into operative position, it is automatically locked therein by the latch members 17 and 17' being received in the openings 16, and is retained in such position until such time as the locking barrel is rotated in a hereinbefore described manner.

A suitable dust and grit excluding shell 29 is carried by the locking member, it being secured thereto by the ring 30, and said shell has frictional contact and operates over the rounded exterior upper surface 31 of the tubular portion 4.

The outer end of the latch member 17 extends at all times into the vertical groove 32 in the sleeve 14 to maintain the openings 16 in alinement with the latch members.

Having thus described my invention, what I claim is:—

1. In a locking device for levers, the combination with a lever provided with a lineal bore, a tubular member through which said lever extends, said member providing a universal fulcrum therefor, a sleeve slidable on said lever and capable of movement to operative position for reception within the upper portion of said tubular member to lock said lever from movement on its fulcrum, a pair of laterally movable spring pressed latch members carried by said lever for automatically engaging with said slidable member to lock the same in its operative position, said latch members provided at their inner ends with overlying hooked portions, a spring interposed between said latch members for normally forcing the same upwardly, rotatable lock controlled mechanism within the lineal bore in said member and coöperating with the hooked inner ends of said latch members and adapted when operated to engage said hooked portions to draw said latch members inwardly to release said slidable member, and a spring for restoring said slidable member to inoperative position on the actuation of said lock controlled mechanism.

2. In a locking device for levers, the combination with a lever, a tubular member through which said lever extends, said member providing a universal fulcrum therefor, a sleeve slidable on said lever and capable of movement to operative position for coöperation with said tubular member to lock said lever from movement on its fulcrum, latch mechanism carried by the lever for automatically engaging the sleeve to lock the same in its operative position, lock controlled mechanism carried by the lever for coöperating with the latch mechanism for releasing the same from said sleeve, mechanism for automatically restoring and retaining said sleeve in its inoperative position, and means carried by said sleeve and movable therewith for inclosing the upper end of said tubular member.

3. In a locking device for levers, the combination with a lever, a tubular stationary member associated therewith and through which the same extends, a member slidable lineally of the lever and capable of movement to operative position intermediate said stationary member and the lever to lock the lever from movement, means for coöperating with the slidable member for locking the same when in its operative position, lock controlled means for releasing said lever locking device, means for automatically restoring said movable member to inoperative position on the release of the locking device therefor, and means carried by said movable member for inclosing the upper end of said tubular member.

4. In combination with a lever provided with a spherical portion, a tubular member through which said lever extends with said spherical portion seated therein, a member positioned within said tubular member for retaining said lever therein, a locking member lineally movable on the lever and capable of movement into operative position between said lever and tubular member to lock the lever from operative movement and to conceal said lever retaining member to prevent the removal of the lever from its socket, and lock controlled means concealed within the lever for engaging directly with said locking member to lock the same when in its operative position.

5. In combination with a lever provided with a spherical portion, a tubular mechanism through which said lever extends with said spherical portion seated therein, a ring surrounding said lever and engaging said tubular portion for retaining the lever therein, a sleeve surrounding and movable lineally of the lever for coöperating when in operative position with said tubular member to prevent the operation of the lever and for locking said ring from removal from said tubular member, and lock controlled devices concealed within the lever for automatically engaging directly with said sleeve for locking the same in its operative position.

In testimony whereof I have signed my name to this specification in the presence of two subscribing witnesses.

GEORGE C. JENSEN.

Witnesses:
HARRY A. TOTTEN,
D. B. RICHARDS.

Copies of this patent may be obtained for five cents each, by addressing the "Commissioner of Patents, Washington, D. C."